April 8, 1952     J. T. BRUBAKER     2,592,388
RODENT TRAP
Filed Aug. 21, 1946     5 Sheets-Sheet 1
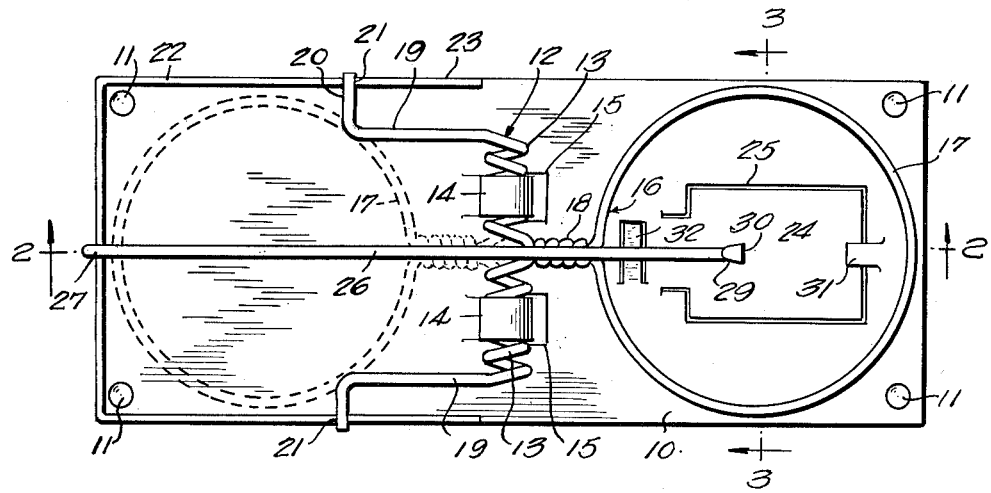
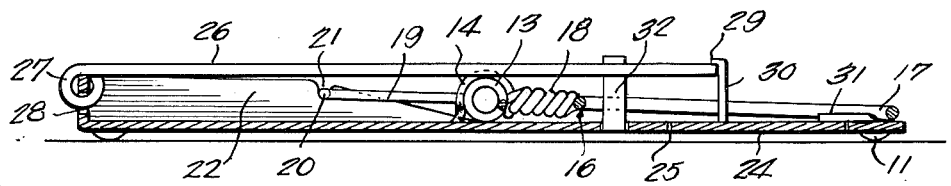
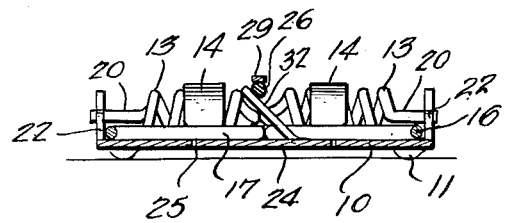
Inventor,
JOHN T. BRUBAKER,
By
Attorney.

April 8, 1952     J. T. BRUBAKER     2,592,388
RODENT TRAP
Filed Aug. 21, 1946                      5 Sheets-Sheet 2
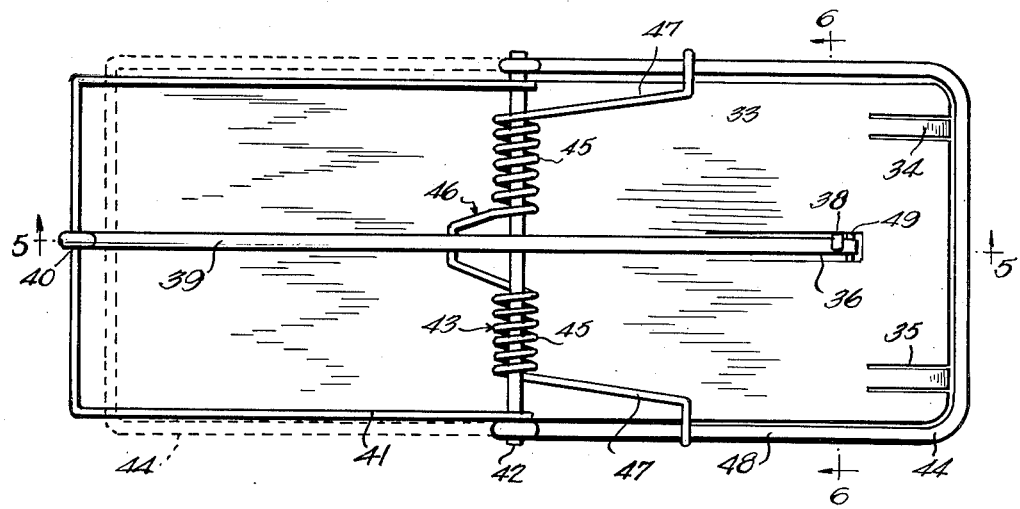
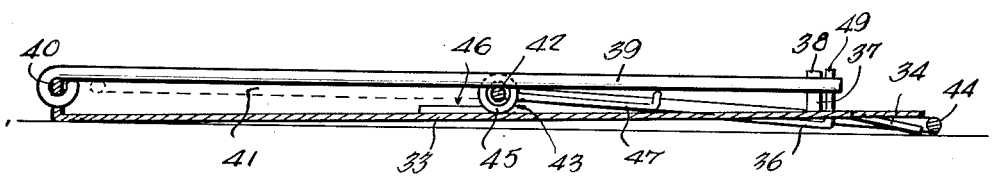
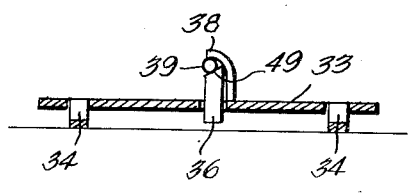
Inventor,
JOHN T BRUBAKER,
By
Attorney, April 8, 1952     J. T. BRUBAKER     2,592,388
RODENT TRAP
Filed Aug. 21, 1946     5 Sheets-Sheet 3
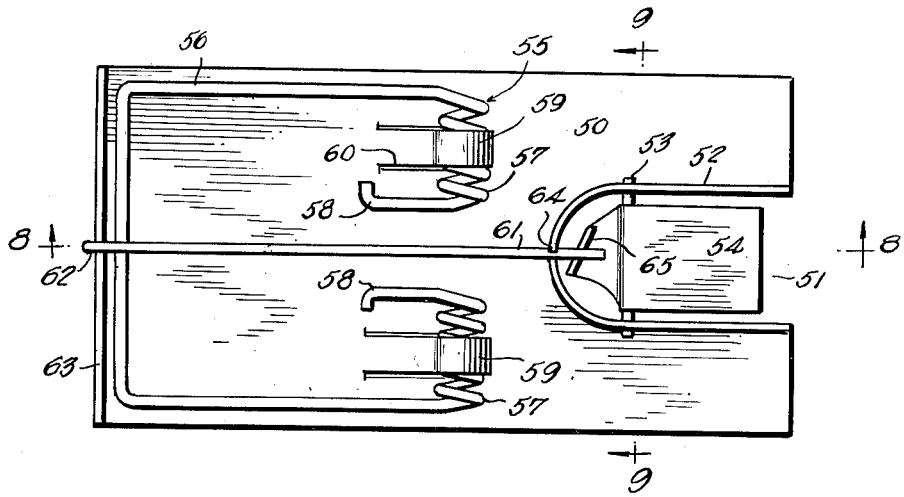
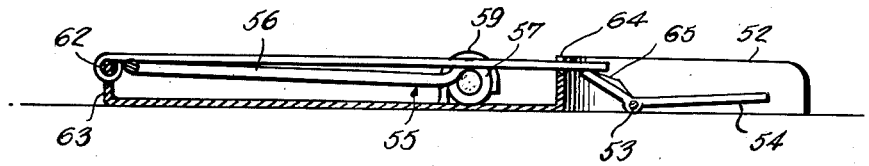
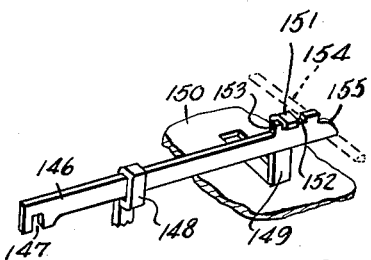
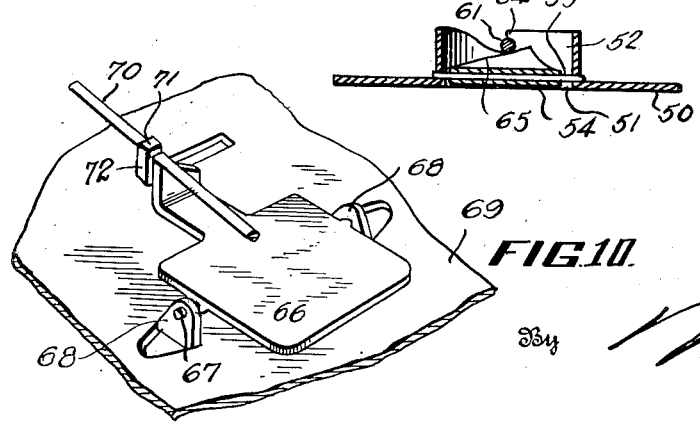
Inventor,
JOHN T. BRUBAKER, April 8, 1952     J. T. BRUBAKER     2,592,388
RODENT TRAP
Filed Aug. 21, 1946     5 Sheets-Sheet 4
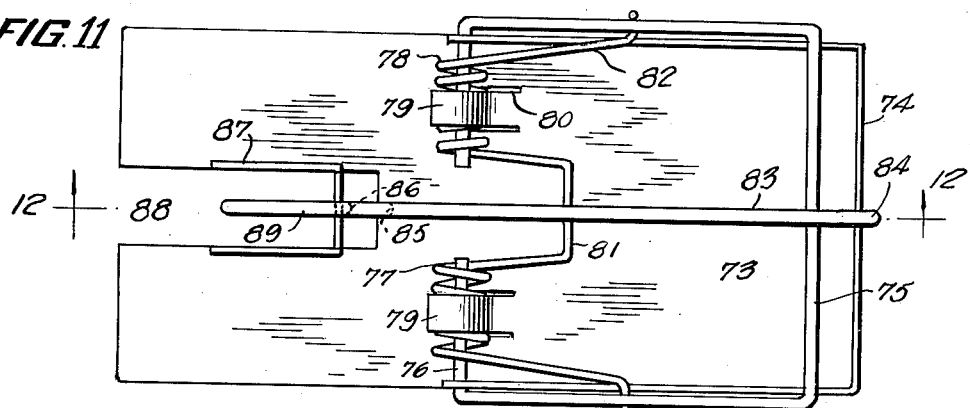
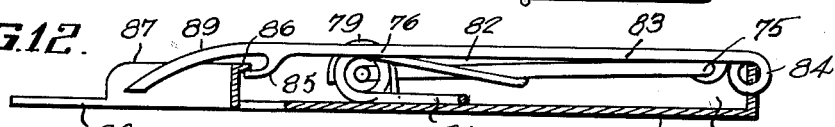
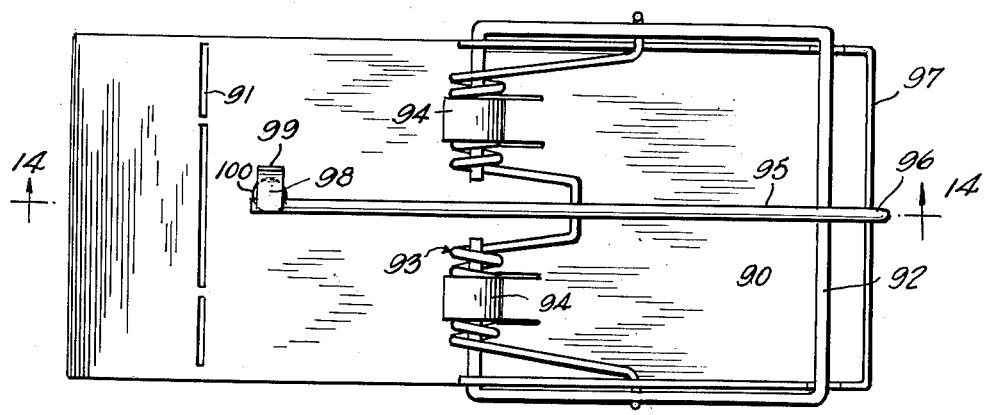
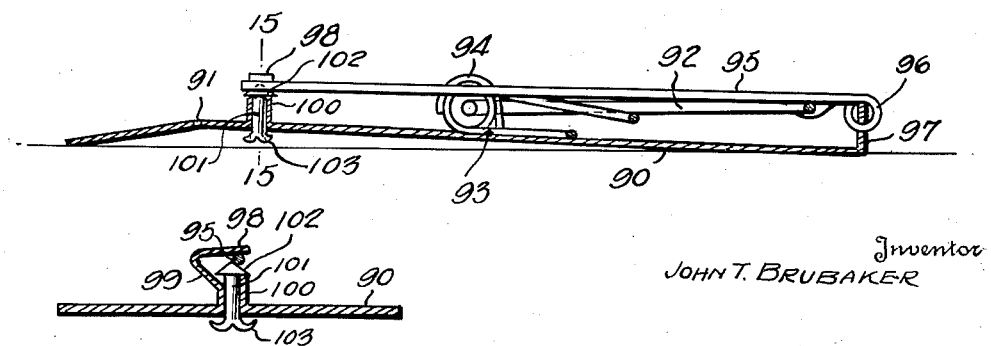
Inventor
JOHN T. BRUBAKER April 8, 1952  J. T. BRUBAKER  2,592,388
RODENT TRAP
Filed Aug. 21, 1946  5 Sheets-Sheet 5
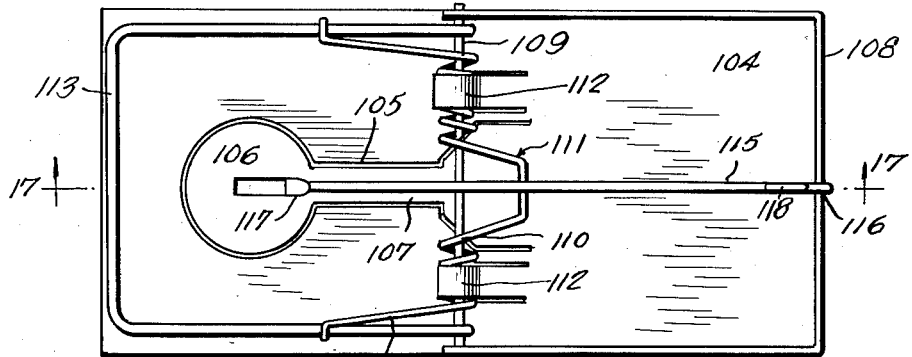
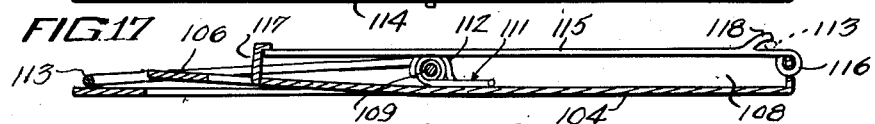
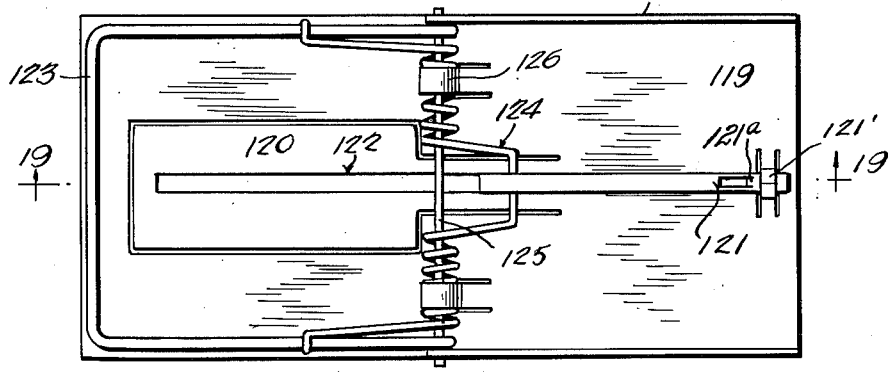
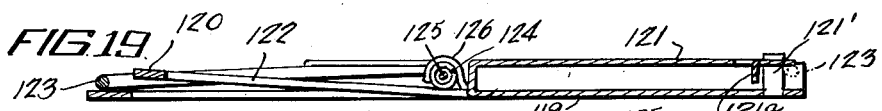
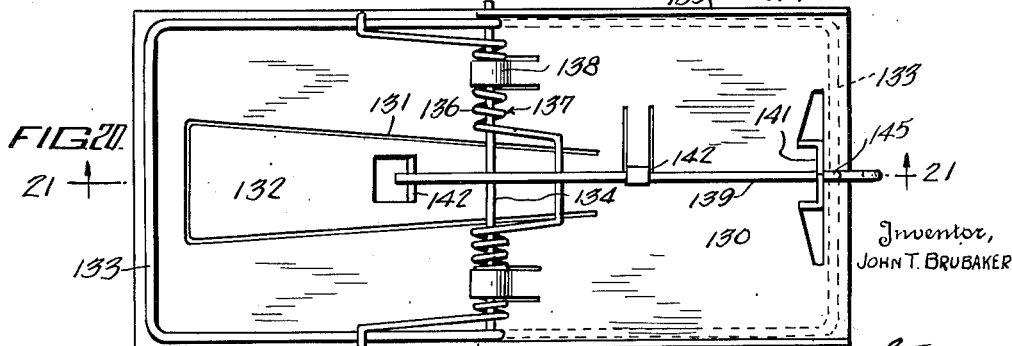
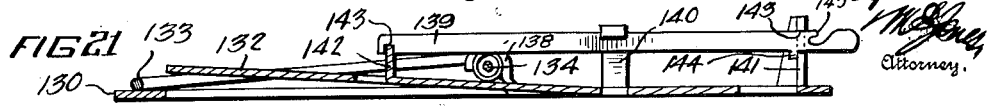
Inventor,
JOHN T. BRUBAKER Patented Apr. 8, 1952

2,592,388

UNITED STATES PATENT OFFICE 2,592,388

RODENT TRAP

John T. Brubaker, Luray, Va.

Application August 21, 1946, Serial No. 691,953

6 Claims. (Cl. 43—81)

This invention relates to a rodent trap, especially adapted for expeditious manufacture in various sizes to catch rats, mice and the like.

It is primarily aimed to provide an exceedingly simple construction in a minimum number of parts capable of rapid and expeditious manufacture and assembly at minimum cost.

A prime object is to provide in such a trap, a base formed or struck from one or more pieces of metal which is movable resiliently practically as a whole or as a bait holder or other part to release the strike mechanism.

Another object is to provide a trap wherein all parts except the strike and its actuating and latching mechanism may be in a single unit, preferably stamped from sheet metal.

Still another object is to provide a construction greatly facilitating expeditious assembly by employing a stamped metal base and retaining cleats for the strike and/or actuating mechanism, beneath which the latter is slipped before bending or clamping thereabout.

One more object is to provide a rigid retaining means on the base, bait holder or equivalent for retaining the trip or latch rod in set position.

A further object is to provide a construction wherein the trap will be set merely by swinging the smiter or strike against the tension of its actuating spring past the latch rod for such smiter or striker.

Further objects are to provide means enabling the rodent to spring the trap without walking on the base, a trap having a base with a cut out portion to enable bait to be placed on the floor and necessitate the rodent extending its nose into a novel restricted space preferably having a surrounding wall, to release the latch and striker; a construction permitting travel of the rodent directly on the floor into trap-tripping position; a construction wherein means is provided to laterally displace a tripped latch rod; a construction wherein the latch rod may have a projection to engage a fixed part on the base or equivalent when set; a construction wherein the latch rod may be set by engagement with a fixed post on the base or other part and also by engagement by a lug on the latch rod with said base or other part; a construction in which the latch rod is formed integral with the base, for instance, specifically with the bait holder; and a construction wherein the latch rod is slidably mounted on the base to maintain the striker set and which is releasable through movement or flexing of the bait holder or equivalent under the weight of the rodent.

Various additional objects and advantages will in part be pointed out and otherwise become apparent from a consideration of the description following taken in connection with the accompanying drawings illustrating a number of operative embodiments.

In said drawings:

Figure 1 is a plan view of one form of trap, the parts being shown in set position in full lines and the smiter or striker being suggested in dotted lines in sprung position.

Fig. 2 is a longitudinal sectional view taken on the line 2—2 of Fig. 1;

Fig. 3 is a transverse sectional view taken on the line 3—3 of Fig. 1;

Fig. 4 is a plan view of a modified form of trap;

Fig. 5 is a vertical longitudinal sectional view taken on the line 5—5 of Fig. 4;

Fig. 6 is a transverse sectional view taken on the line 6—6 of Fig. 4;

Fig. 7 is a plan view of a third form of trap;

Fig. 8 is a longitudinal section taken on the line 8—8 of Fig. 7;

Fig. 9 is a transverse section taken on the line 9—9 of Fig. 7;

Fig. 10 is a fragmentary perspective view of a fourth modified form;

Fig. 11 is a plan view of a fifth modified form;

Fig. 12 is a longitudinal section taken on the line 12—12 of Fig. 11;

Fig. 13 is a plan view of a sixth modified form;

Fig. 14 is a longitudinal section taken on the line 14—14 of Fig. 13;

Fig. 15 is a cross-section taken on the line 15—15 of Fig. 14;

Fig. 16 is a plan view of a seventh modified form;

Fig. 17 is a longitudinal section taken on line 17—17 of Fig. 16;

Fig. 18 is a plan view of an eighth modified form;

Fig. 19 is a longitudinal section taken on line 19—19 of Fig. 18;

Fig. 20 is a plan view of a ninth modified form;

Fig. 21 is a longitudinal section taken on the line 21—21 of Fig. 20, and

Fig. 22 is a fragmentary perspective view of a modified form of slidable latch rod of the general type employed in Figs. 20 and 21.

Referring specifically to the drawings wherein like reference characters designate like or similar parts throughout the different views, and first to the form of Figs. 1 to 3, 10 designates a base which is preferably stamped in a single piece of generally flat resilient metal and preferably provided with depressions 11 or the equivalent as at the corners thereof, to elevate the lower surface of the base proper from the floor or other support. An actuating spring device for the smiting or striking parts is shown at 12 and may consist of coil springs 13 which are secured to the base 10 in any suitable manner as by means of cleats or bearings 14 integral with the base. Such cleats 14 are formed by making U-shaped slits 15 in the base at the ends nearest wall 22 and striking up the material of the base thereat. The said struck up material is then bent so that the coils 13 may be expeditiously slid or positioned thereunder, following which the cleats are bent to final position as shown in the drawings so as to clamp against the coil springs 13. Such a construction enables expeditious insertion of springs 13 under the cleats, followed by clamping in modern, fast operating machinery.

Said coil springs 13 are integral with or form part of smiter or striker generally designated 16. Such device consists of a single length of metallic wire having a smiting element 17 in the form of a ring or otherwise, which wire is twisted together at 18, between the coil springs 13 and elements 17. The outer terminals or shaft means of the wire arms 19 extending from coil springs 13 and the tension of the latter is such as to snap and maintain lugs 20 on the arms in notches 21 formed in the upper edges of a vertical wall 22 integral with the base 10, extending across one end and partly along the sides thereof. It will be noted that the ends of the wall 22 are inclined at 23 so as to guide the lugs 20 upwardly along the same into the notches 21 as the coil springs are pushed in place beneath cleats 14. The tension of the coil springs 13 urges swinging movement of the smiter or striker 16 from the dotted line position in Figure 1 to the full line position in the same figure and in Figure 2, wherein it engages the upper surface of the plate at the zone of baiting, about a bait holder 24.

Said bait holder 24 is provided by slitting the base 10 at 25 and accordingly it is integral with the base and is resiliently connected thereto. A trip member in the form of a rod or latch 26 is loosely attached by an eyelet 27 in an opening 28 of the wall 22 and is engageable under a lip 29 of a post 30 rising rigidly from the bait holder 24, being integral therewith or initially separate, as preferred. By the contact of the smiting element 17 in set position with the under surface of trip 26, the tension of coil springs 13 maintains the free end of trip 26 in engagement with lip 29 and the trap thus sensitively set. Upward movement of the free end of bait holder 24 is limited by contact with a lug 31 formed integral with the base 10 or otherwise.

The trap in use, is set as suggested by the dotted lines in Fig. 1 with bait disposed on the holder or element 24 and with such device 16 held in set position through the engagement of trip 26 with lip 29. The weight of a rodent treading on holder 24 will cause the same to lower or spring downwardly at its connection with the base 10, thus moving lip 29 out of engagement with trip 26 whereupon the striker 16 is freed and under the action of coil springs 13, will move or spring from the dotted line position, displacing trip 26, to the full line position in Figs. 1 and 2, thus smiting or striking the rodent against base 10.

If desired, I may provide a stud 32, struck from the base 10 or otherwise, having an inclined or cam surface engaging the trip 26 and functioning to deflect the latter laterally when released by the lip 29.

Referring to the form shown in Figs. 4 to 6, a metallic base is provided at 33 of resilient metal like the base 10, the same being generally inclined and having spring supporting leaves at 34 engaging the floor and which are formed by slitting the base along the lines 35. Integral with base 33 at its end adjacent to leaves 34 and formed by slitting the base is a resilient holder or trip 36 adjacent the latter and rigid when the base is a post 37 having a lip 38 forming a hook engaging a latch rod 39, similar to that shown at 26 in the first form, pivotally connected as at 40 to a wall 41 rising integrally from the base and extending across one end of the latter and partly along two sides thereof.

A transverse rod 42 is secured in portions of the wall 41 as bearing, and mounts an actuating spring device 43 for a smiter or striker 44 pivoted on the rod 42 and forms a shaft means for such smiter or striker. Spring device 43 may have coil springs 45 through which said rod 42 passes, connected by a loop 46 bearing on the base and having terminal arms 47 which are in underlapping engagement with side arms 48 of the smiter 44 when set. Said spring device 46 is tensioned when the smiter 44 is in the set or dotted line position of Figure 4.

Suitable bait is placed on or adjacent the holder 36 and the base at the adjacent end is adapted to spring or lower under the weight of a rodent, straightening the leaves 34 and moving the holder 36 which is normally slightly above the floor, into engagement with the floor, thereby releasing the latch rod 39 whereupon the tensioned spring device 46 moves the smiter 44 to smiting or full line position closely following the adjacent portion of the edge of the base. The latch road 39 is tripped as the holder 36 moves upwardly through contact with the floor because an upper cam surface 49 thereof displaces and moves the rod 39 laterally, thus releasing the smiter.

In the form of Figs. 7 to 9, a one-piece metallic base 50 is provided which is open at 51 so that a rodent may travel on the floor to reach the bait and spring the trap without treading on the base. Surrounding the opening 51, base 50 has a vertical wall 52 mounting a transverse rod 53 on which a trip lever or bait holder 54 is pivoted. The spring device 55 in this form may be generally of U-shape, being made of a single length of wire to provide a smiter at 56 and a pair of spaced coil springs 57 from which terminals 58 lead and which rest on the base. The smiter is clamped to the base in the same manner as in Fig. 1 by means of integral cleats 59 engaging the coil springs 57, and formed by slitting the base at 60. Such coil springs are tensioned in the set or full line position of the smiter Figure 7 and in which position the smiter is held by a latch rod 61, loosely pivoted at 62 to a vertical end wall 63 integral with the base. Said latch rod 61 hooks beneath a lip 64 formed integral with the wall 52 and is held in such position through the tension of the spring device 55 and engagement of the smiter 56 with the under surface of the latch rod. In said set position as shown in Figs. 7 and 8, latch rod 61 is engaged by the upper inclined surface 65 of the holder or trip lever 54.

It will be particularly noted that a slight space only is left between the margin of the bait holder or trip lever 54 and the wall 52, thus necessitating the rodent entering its nose into said space in an endeavor to obtain the bait located on the floor adjacent the holder 54, and thus offering little possibility of movement of the rodent adjacent to the holder 54 without springing the trap by laterally displacing the latch rod 61 and releasing the smiter 56 which swings upwardly and against the base at the end of the latter having a wall 52, through the action of tension springs 57.

In Figure 10, I have shown another form of the bait-holder 54, here designated 66, modified in that it is pivoted by means of trunnions 67 to lugs 68 struck up from a metallic base 69, otherwise similar to that at 50 with respect to having a wall 63 and loosely mounting a latch rod 61, and having cleats 59 positioning a spring device like 55 for the same action as in Figure 7. The latch rod 70, in this instance, which is the equivalent of that at 61, in lieu of engaging a lip 64 on wall 52 engages beneath a lip 71 on a post 72 similiar to element 37 (Figs. 4 to 6) struck from or otherwise provided on base 69.

Referring now to the form shown in Figures 11 and 12, the trap employs a metallic base 73 having a vertical wall 74 integral therewith across one end and partly along its sides. The smiter 75 is generally of U-shape having inturned terminals or shaft means 76 pivoted in the wall 74 adjacent its free ends. The actuating spring device 77 for the smiter 75 is generally like that employed in the form of Figs. 4 to 6 since it has coil springs 78 clamped in place by cleats 79 on the base 73 formed slits at 80. The central portion 81 of the spring device 77 bears against the base 73 and arms 82 of such device in the set position of the trap engage the under surface of the smiter 75.

Said smiter is held set by a latch rod 83 pivoted loosely at 84 to the wall 74 and having a lug or hook 85 which is engageable beneath a lip 86 formed on a vertical wall 87 struck up from the base 73 about an opening 88 therein. The spring device 77 is tensioned in the set position and such tension through contact of the smiter 75 with latch 83 maintains the hook 85 in engagement with the lip 86 and the trap thus set. Latch rod 83 at 89 projects into the space surrounded by wall 87 and hence a restricted space is provided as in the case of the form of Figures 7 to 9 requiring the rodent to enter its nose between the walls and extension 89 as it travels along the floor in the space 88 in an endeavor to reach bait placed on the latter adjacent the portion 89, so as to displace the latch rod by disengaging hook 85 from the lip 86, and permitting the tensioned spring to swing the smiter 75 against the base 73 in the vicinity of the wall 87.

In the form shown in Figures 13 to 15, a resilient metallic base 90 is provided which is raised at a point intermediate its ends and there weakened or rendered more resilient through the provision of slots 91, so as to tend to lower toward a flattened position under the weight of a rodent. In lieu of the slots 91, the plate or base 90 may be otherwise rendered sufficiently resilient throughout or at the highest point, as by decreasing its thickness. The smiter 92 is identical with that at 75 and the spring device 93 is identical with that at 77 and is held in place in a similar manner by cleats 94 identical with those at 79. The action of the smiter 92 and spring device 93 is similar to those at 75 and 77, respectively, and the smiter and spring are held in set position by means of a trip rod 95 loosely pivoted at 96 to a wall 97 on base 90, similar to wall 74.

Said trip rod 95 is adapted to be placed in set position beneath a latch lip 98 formed on an integral lug 99 on the base and which may form part of a short upright tube 100, integral with such base and adjacent which bait may be spread. Vertically slidable to a limited extent in the short tube or sleeve 100 is a latch or trip member 101 having a conical head 102 which overlaps and rests on the upper end of short tube 100 and bears against the latch rod 95. The lower end of trip 101 is widened or spread at 103 to prevent detachment from the tube 100. Trip 103 does not normally touch the floor or support for the base 90, but under the weight of a rodent, base 90 moves downwardly and flattens somewhat, moving latch or trip 101 into engagement with the floor and causing head 102 to laterally dislodge the free end of latch rod 95 from beneath the lip 98, whereupon the smiter 92 swings into engagement with the opposite end of the base to catch the rodent under action of the spring device 93 as in the form of Figures 11 and 12.

Coming now to the form disclosed in Figures 16 and 17, a resilient metallic base is provided at 104 which is slit at 105 to provide a bait holder or trip 106 inherently urged into the set position of Figures 16 and 17, it being realized that the bait holder 106 has a relatively long strap 107 so that the necessary resilient action is afforded for the holder or trip 106.

Like in the form of Figure 11, base 104 has an integral vertical wall 108 across one end and partly along its sides. Such wall mounts a rod 109 which passes through coils 110 of a spring device 111 like that employed at 77, and clamped to the base 104 by cleats 112 formed and functioning in the same manner as in Figure 1, for example. A smiter 113 generally of U-shape has its terminals pivoted to the rod 109 and spring device 111 has arms 114 coacting with side arms of the smiter 113 in the same manner as arms 82 coact with smiter 75.

The latch rod 115 in this form is loosely connected at 116 to wall 108 so as to have a slight longitudinal as well as pivotal movement. The free end of rod 115 engages beneath a lip 117 formed integrally with the holder 106, being struck therefrom, for example. In addition, to render the trap sensitive at more than one location, when set, latch rod 115 has a hook at 118 beneath which the smiter 113 engages as suggested by the dotted lines in Figure 17. Rod 115 is held in set position by the coaction of the spring device 111 and smiter 113 therewith, like the spring device 77 and smiter 75 in Figure 11. It will be noted that smiter 113 in set position is engaged beneath the hook 118 and it is moved to that position simply by depressing it as the rod 115 will have slight longitudinal movement and automatic spring-returned action due to the resilience of the parts; particularly the holder 106. This produces a double and very sensitive setting as the trap will be sprung if either trip 106, smiter 113 or latch 115, at practically any location is touched by a rodent.

Referring now to Figures 18 and 19, the base 119 corresponds in material and action to that of Figures 16 and 17, differing therefrom as to the shape of a holder or trip 120 formed and functioning like that at 106. Instead of having a separate rod 115, a latch rod 121 is formed integral with the base 119 preferably extending directly from and forming part of the holder 120, the latter being slit along a line 122 to form the rod 121 and then bending the latter 180° to the position shown. The smiter 123, spring device 124, rod 125 and cleats 126, are similar in structure and function to the corresponding parts at 113, 111, 109 and 112, respectively, in Figure 16. Rod 125 is mounted in vertical walls 127 integral with and rising from the base 119. A lug 121ª depends from rod 121 and terminates short of the base 119 so that when smiter 123 depresses the free end of rod 121, lug 121ª contacts the base 119 and arrests depression of the rod to offer the necessary resistance for the smiter to displace the rod and move beneath it.

In setting the trap of the last mentioned form of Figs. 18 and 19, the smiter 123 is moved from the full line position on the axis 125, to the extent of 180°, rod 121 being in its path and contacted thereby and depressed slightly and moved to the left against the tension of the spring action of trip 122, following which the thus tensioned trip 120 restores the rod 121 to the right and across the smiter 123 setting the trap.

Figures 20 and 21 illustrate a further form wherein 130 designates a resilient sheet metal base as in the preceding forms, slit at 131 and sprung to form a trip or bait holder 132 of suitable shape corresponding to that at 106. A striker 133 is pivoted to a rod 134, like rod 125, mounted in integral vertical side walls 135 of the base. Said rod 134 passes through coil springs 136 of a striker-actuating spring device 137 like that at 111 and 124. Said coil springs are clamped to the base by cleats 138 integral with the latter like cleats 126.

The striker latch rod is here designated 139 and is longitudinally slidable in guides 140 and 141 struck up from the base or otherwise formed. A lug 142 rises from trip or bait holder 132 and is interengaged in a notch 143 of slidable latch rod 139. Said trip or bait holder 132 inherently springs upwardly to the position of Figure 21 but latch rod 139 is held against upward movement as it is overlapped by a hook 142 on guide 140, and passes through an opening 143 in guide 141. Such inherent resilience of the trip 132 also slightly slides the latch rod 139 to the right but such movement is limited by abutment of a stop 144 on the latch rod with guide 141. The trap is set merely by swinging the striker or smiter 133 from the full line to the dotted line position in Figure 20 in which movement, a hook 145 on latch rod 139 in the path of the striker is engaged by it and moves slightly to the left against the tension of trip 132, after which the striker under urgency of said trip is moved to the right so that hook 145 overlaps and sets the striker or smiter.

The trap is operated by the trip 132 being depressed by the weight of a rodent thereon, the depression sliding latch rod 139 to the left and at the hook releasing the smiter 133 which is moved to the smiting or full line position of Figures 20 and 21 by spring device 137.

In Figure 22 is shown a modified form of slidable latch rod which functions identically with that at 139. Rod 146 of this form has a notch 147 to serve like that at 143 and is positioned by guides 148 and 149 integral with and rising from the base 150. Guide 148 has an opening through which the latch rod slides while guide 149 has a lip 151 overhanging the latch rod in a notch 152 thereof providing an abutment or stop shoulder at 153 functioning identically like the stop 144. The striker 154 which is identical with striker 133 is depressed against the cam-shaped outer end 155 of the latch 146, like the corresponding ends of parts 118, 121 and 145, moving the rod 146 to the left against the tension of the spring-trip such as 132 following which such tensioned trip slides the latch rod to the right to the extent limited by stop 153 where it overlaps striker or smiter 154 and sets the trap.

Attention is called to the fact that various changes may be made without departing from the spirit and scope of the invention, it being clear that in many instances parts from various forms may be substituted or interchanged with respect to parts of other forms. It is especially to be noted that the angle, shape, or disposition of trips, bait holders or the like, such as 24, 54, edge 65 of the latter, 66, edge 65 of the latter, 36, leaves 34, part 89, camber base 90, 106, 120 and 132, may be disposed or operate at any desired angle with respect to the horizontal or vertical or otherwise, and that such parts as well as others may be of any desired size or configuration. In many instances, too, parts may be interchanged or reversed as to their support on relatively fixed and relatively movable ones such as by placing 30 and 117 on the bases 10 and 104, respectively, rather than on the trips, and by placing cam 32 on trip 24.

What is claimed is:

1. A rodent trap comprising a base having a portion thereof that is resilient and capable of being displaced relative to other portions of the base, means extending upward from the base and constituting bearings, a transverse member positioned in said bearings and provided with spring means at the ends thereof, a striker member actuated by said spring means to move it from a set to a release position, a trip member pivoted on the base for swinging movement between the sides of the striker member and adapted to engage a portion of the latter to hold it in set position, latch means secured to the base adapted to hold the trip member in set position, said latch means having portions thereof constituting a camming surface adapted to engage the trip member, said resilient portion of the base when depressed by a rodent being adapted to move a portion of the latch means and cause a release of the trip member to permit the spring means to move the striker to striking position.

2. A rodent trap according to claim 1 wherein said portion of the base capable of being displaced is a bait holder, and said latch means includes a post on said bait holder, and a stud on the base provided with said camming surface.

3. A rodent trap according to claim 1 wherein said portion of the base capable of being disposed is a bait holder integral with the base, said latch means includes a post on said bait holder, and a stud on the base provided with said camming surface, and said striker includes a ring disposed to surround said bait holder in the released position of said striker.

4. A rodent trap according to claim 1 wherein said base has leaf means to elevate one end of the base from the floor so that a portion of the base may be depressed, said latch means includes a hook on the last-mentioned portion, and a holder trip on the last-mentioned portion having a camming surface at its upper end to engage the trip member.

5. A rodent trap having a generally arched resilient base member adapted to be positioned on a floor and to flatten under the weight of a rodent, a smiter having shaft means disposed across said base and journalled in said base, spaced-apart cleats struck up from and integral with said base, actuating spring means for said smiter having sections of coils disposed on said shaft means and overlapped from above by said cleats, a latch rod pivoted to the base to restrain the smiter, a sleeve rising from the base and having a hook beneath which the latch rod is engageable to hold the smiter in set position, a slidable trip carried by said sleeve, said trip being disposed normally above the floor level and adapted for actuation through contact with the floor as the base flattens under weight of a rodent.

6. A rodent trap having a generally arched resilient base member adapted to be positioned on a floor to flatten under the weight of a rodent, a striker and actuating means therefor carried by the base, a trip rod pivoted to the base to restrain the striker, a sleeve rising from the base and having a hook beneath which the trip rod is engageable to hold the parts in set position, a slidable trip latch carried by said sleeve, said trip latch being disposed normally above the floor level and adapted for actuation through contact with the floor as the base flattens.

JOHN T. BRUBAKER.

REFERENCES CITED

The following references are of record in the file of this patent:

UNITED STATES PATENTS

| Number | Name | Date |
|---|---|---|
| 744,343 | Hooker | Nov. 17, 1903 |
| 1,429,189 | Chasse | Sept. 13, 1922 |
| 1,496,181 | Sowinski | June 3, 1924 |